United States Patent
Maruyama

(10) Patent No.: US 10,618,202 B2
(45) Date of Patent: Apr. 14, 2020

(54) FAILURE CAUSE DIAGNOSTIC DEVICE FOR INJECTION MOLDING MACHINE

(71) Applicant: FANUC Corporation, Yamanashi (JP)

(72) Inventor: Junpei Maruyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 251 days.

(21) Appl. No.: 15/223,108

(22) Filed: Jul. 29, 2016

(65) Prior Publication Data

US 2017/0028593 A1 Feb. 2, 2017

(30) Foreign Application Priority Data

Jul. 31, 2015 (JP) .................................. 2015-151961

(51) Int. Cl.
| | | |
|---|---|---|
| *B29C 37/00* | (2006.01) | |
| *G06N 99/00* | (2019.01) | |
| *G06N 20/00* | (2019.01) | |
| *B29C 45/76* | (2006.01) | |

(52) U.S. Cl.
CPC ........ *B29C 37/0096* (2013.01); *B29C 45/768* (2013.01); *G06N 20/00* (2019.01); *B29C 2945/76949* (2013.01)

(58) Field of Classification Search
CPC .................................................... B29C 45/76
See application file for complete search history.

(56) References Cited

U.S. PATENT DOCUMENTS

| | | | |
|---|---|---|---|
| 3,821,048 A | 6/1974 | Acker et al. | |
| 2001/0051858 A1 | 12/2001 | Liang et al. | |
| 2003/0082255 A1* | 5/2003 | Konishi | B29C 45/76 |
| | | | 425/171 |
| 2004/0093115 A1* | 5/2004 | Usui | B29C 45/768 |
| | | | 700/204 |
| 2006/0009874 A1* | 1/2006 | Saito | B29C 45/76 |
| | | | 700/204 |
| 2008/0099943 A1 | 5/2008 | Yamagiwa et al. | |
| 2009/0099679 A1* | 4/2009 | Sandoval | B29C 45/768 |
| | | | 700/110 |

(Continued)

FOREIGN PATENT DOCUMENTS

| | | |
|---|---|---|
| CN | 101168283 A | 4/2008 |
| CN | 103009593 A | 4/2013 |

(Continued)

OTHER PUBLICATIONS

Office Action in JP Application No. 2015-151961, dated Aug. 2, 2016.

(Continued)

*Primary Examiner* — Moazzam Hossain
(74) *Attorney, Agent, or Firm* — Hauptman Ham, LLP

(57) ABSTRACT

A failure cause diagnostic device of the present invention receives input of internal and external state data on injection molding machines and diagnoses failure cause of the injection molding machines by means of a machine learning device. An internal parameter of the machine learning device is obtained by performing machine learning using the state data obtained from the injection molding machines subject to failure cause and the state data obtained from the injection molding machines free of failure cause.

12 Claims, 2 Drawing Sheets

(56) References Cited

U.S. PATENT DOCUMENTS

| | | | | |
|---|---|---|---|---|
| 2013/0142899 A1* | 6/2013 | Murata | ............... | B29C 45/7653 425/150 |
| 2016/0110032 A1* | 4/2016 | Okochi | ................. | B22D 17/32 425/162 |
| 2016/0250791 A1* | 9/2016 | Schiffers | ................. | B29C 45/76 264/40.4 |
| 2016/0274561 A1* | 9/2016 | Stone | ................... | G05B 19/188 |

FOREIGN PATENT DOCUMENTS

| | | | |
|---|---|---|---|
| CN | 103732378 A | | 4/2014 |
| CN | 103737878 A | | 4/2014 |
| DE | 2410055 A1 | | 9/1974 |
| EP | 1253491 A2 | | 10/2002 |
| EP | 2737993 A1 | | 6/2014 |
| JP | H05157662 A | * | 6/1993 |
| JP | H05157662 A | | 6/1993 |
| JP | 11-348087 A | | 12/1999 |
| JP | 2002229623 A | * | 8/2002 |
| JP | 2002229623 A | | 8/2002 |
| JP | 2005-301582 A | | 10/2005 |
| JP | 2014-133378 A | | 7/2014 |
| JP | 2014133378 A | * | 7/2014 |

OTHER PUBLICATIONS

Office Action in DE Application No. 102016009114.2, dated Apr. 18, 2019, 11pp.

Office Action in CN Application No. 201610615418.2, dated Jan. 18, 2019, 21pp.

Office Action in CN Application No. 201610615418.2, dated May 27, 2019, 22pp.

"Chinese Doctoral Dissertations & Master's Theses Fill-text Database (Master) Engineering Science & Technology I", Mar. 2004, 39pp.

"Application of Computer in Material Science and Engineering", pp. 233-240, 9pp.

* cited by examiner

FIG. 1A

LEARNING STAGE

TEACHER DATA

| x1 | x2 | x3 | ... | y |
|---|---|---|---|---|
| 1.0 | 11.5 | 100.0 | ... | 0 |
| 2.2 | 20.4 | 99.2 | ... | 0 |
| 11.0 | 24.8 | 120.8 | ... | 1 |
| 5.2 | 31.2 | 168.4 | ... | 1 |
| ⋮ | ⋮ | ⋮ | ⋮ | ⋮ |

ADVANCE LEARNING BY TEACHER DATA

MACHINE LEARNING DEVICE

FIG. 1B

PREDICTION STAGE BASED ON LEARNING RESULT

INPUT DATA

| x1 | x2 | x3 | ... |
|---|---|---|---|
| 8.3 | 54.2 | 154.1 | ... |

PREDICT OUTPUT DATA FROM INPUT DATA BY LEARNING RESULT

MACHINE LEARNING DEVICE

OUTPUT DATA

| y |
|---|
| 1 |

FAILURE CAUSE DIAGNOSTIC DEVICE FOR INJECTION MOLDING MACHINE

RELATED APPLICATIONS

The present application claims priority to Japanese Patent Application Number 2015-151961, filed Jul. 31, 2015, the disclosure of which is hereby incorporated by reference herein in its entirety.

BACKGROUND OF THE INVENTION

Field of the Invention

The present invention relates to a failure cause diagnostic device for an injection molding machine, and more particularly, to a failure cause diagnostic device capable of determining the cause of failure in high reliability diagnosis regardless of the knowledge and experience of analysts.

Description of the Related Art

In case of failure of an injection molding machine, a user or a manufacturer's engineer conventionally analyzes records, such as molding conditions and alarming histories, stored in the injection molding machine and investigates the cause of the failure.

For example, Japanese Patent Application Laid-Open No. 05-157662 discloses a conventional technique related to failure analysis of an injection molding machine. According to this technique, noise and vibration from the components of the injection molding machine are spectrum-analyzed to obtain failure spectrum information in case of failure of the injection molding machine, and a basic failure spectrum pattern is obtained from the failure spectrum information by learning and used for failure determination.

Further, Japanese Patent Application Laid-Open No. 2002-229623 discloses an analysis/evaluation system for a resin machine, having a learning function such that parameters are accumulated in a database during an operation of the resin machine, a processing method for the resin machine is analyzed based on the accumulated data, and the result of the analysis is reflected on the next cycle of analysis.

According to some conventional manual failure analysis methods, the cause of failure cannot be easily identified, since the knowledge and experience of users and manufacturers' engineers who perform analyses are limited.

Further, a controller for an injection molding machine or a management device connected to the injection molding machine conventionally cannot either identify the cause of failure, based on data such as the molding conditions and the alarming histories acquired from the injection molding machine, or calculate such molding conditions that failure does not occur.

SUMMARY OF THE INVENTION

Accordingly, the object of the present invention is to provide a failure cause diagnostic device for an injection molding machine, capable of determining the failure cause diagnosis in high reliability regardless of the knowledge and experience of analysts.

A failure cause diagnostic device in accordance with the present invention is a failure cause diagnostic device for finding out the cause of failure of the injection molding machine on the basis of input internal and external status data by means of a machine learning device wherein; an internal parameter of the machine learning device is provided through machine learning on the status data obtained upon occurrence of the failure and that of the normal operation of the machine.

In the failure cause diagnostic device, the internal and external state data include a load on a driving unit of the injection molding machine, frequency response of axes, resin pressure, clamping force, alarming history, machine operation history, process monitoring data for each molding cycle, molding conditions, and/or quality information on a molded article and information on the occurrence of failure cause.

The failure cause diagnostic device predicts the failure cause of the injection molding machine using the state data based on the result of the machine learning.

The failure cause diagnostic device identifies a state variable causative of failure cause among the state data when the occurrence of the failure cause is predicted.

The failure cause diagnostic device calculates the correlation between the state data and the occurrence of failure cause when the occurrence of the failure cause is predicted.

The failure cause diagnostic device calculates an adjusted value of the state data so that no failure cause occurs when the occurrence of failure cause is predicted.

The failure cause diagnostic device identifies state data causative of failure cause among the state data when the failure cause is caused.

The failure cause diagnostic device calculates the correlation between the state data and the occurrence of failure cause when the failure cause is caused.

The failure cause diagnostic device calculates an adjusted value of the state data so that no more failure cause occurs when failure cause is caused.

In the failure cause diagnostic device, the internal and external state data are input from a plurality of injection molding machines connected by a network.

In the failure cause diagnostic device, the internal parameter of the machine learning device is shared by a plurality of injection molding machines connected by a network.

A machine learning device according to the present invention is a device having learnt failure cause diagnosis of an injection molding machine based on internal and external state data on the injection molding machine. An internal parameter of the machine learning device is obtained by performing machine learning using the state data obtained when failure cause is caused and the state data obtained when no failure cause is caused.

According to the present invention, highly reliable failure cause diagnosis can be achieved regardless of the knowledge and experience of analysts by performing the machine learning using state variables obtained from the injection molding machines subject to failure cause and the state variables obtained from the injection molding machines free of failure cause.

Further, a controller for each injection molding machine or a management device connected to the injection molding machine can identify the cause of failure, based on data such as the molding conditions and the alarming history acquired from the injection molding machine, and calculate such molding conditions that failure does not occur.

BRIEF DESCRIPTION OF THE DRAWINGS

The above and other objects and features of the present invention will be obvious from the ensuing description of embodiments with reference to the accompanying drawings, in which:

FIG. 1A is a diagram illustrating an outline of the operation of a machine learning device for supervised learning under the learning state;

FIG. 1B is a diagram illustrating an outline of the operation of a machine learning device for supervised learning under the prediction stage based on the result of learning.

DETAILED DESCRIPTION OF THE PREFERRED EMBODIMENTS

Figure 2:
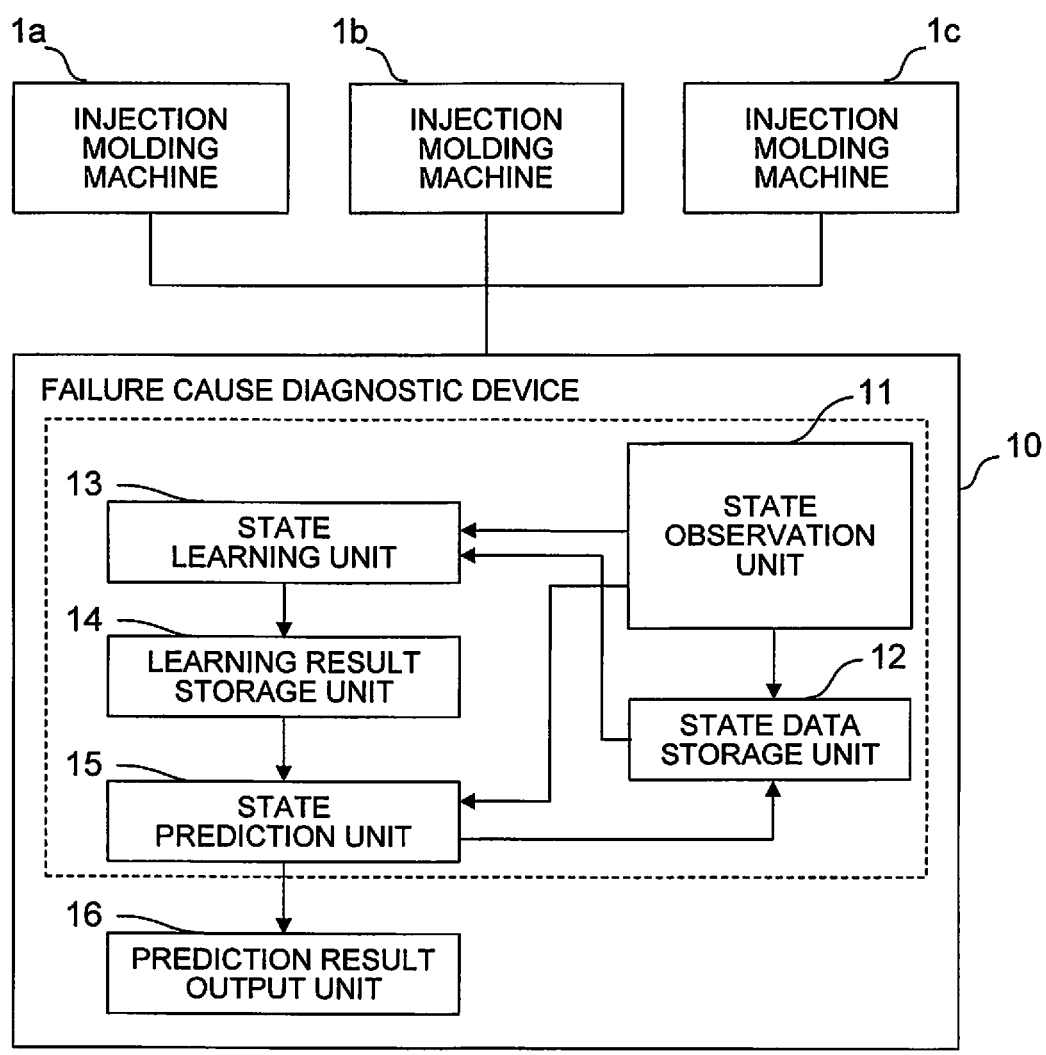
FIG. 2 is a schematic configuration diagram of an failure cause diagnostic device according to an embodiment of the present invention.

An embodiment of the present invention will now be described with reference to the accompanying drawings.

In the present invention, the cause of failure cause is diagnosed by performing machine learning using state variables obtained from injection molding machines subject to failure cause and state variables obtained from injection molding machines free of failure cause. At the time of occurrence of failure cause, moreover, a state variable causative of the failure cause is specified among the above state variables and an adjusted value of the specified state variable is calculated so as to prevent the occurrence of failure cause.

1. Machine Learning

In general, machine learning is classified into various algorithms, such as supervised learning, unsupervised learning, and reinforcement learning, depending on the object and conditions. The present invention is intended to learn the correlation between states represented by internal or external parameters of an injection molding machine and failure in the injection molding machine. Thus, the present invention adopts the algorithm for supervised learning in consideration of the feasibility of learning based on specified data and the necessity of cause diagnosis based on the result of the learning.

FIG. 1 is a diagram illustrating an outline of the operation of a machine learning device for supervised learning. The operation of the machine learning device for supervised learning can be roughly divided into two stages, a learning stage and a prediction stage. The machine learning device for supervised learning learns how to output the value of a target variable used as output data when the value of a state variable (explanatory variable) used as input data is input if teacher data including the value of the state variable and the value of the target variable is given in the learning stage (FIG. 1A). By giving a number of such data, the machine learning device constructs a prediction model for outputting the target variable value relative to the state variable value.

When new input data (state variable) is given in the prediction stage (FIG. 1B), moreover, the machine learning device for supervised learning predicts and outputs the output data (target variable) based on the result of the learning (constructed prediction model).

A regression equation for the prediction model, such as equation (1) given below, is set as an example of learning of the machine learning device for supervised learning. The learning is advanced by adjusting the values of coefficients $a_0, a_1, a_2, a_3, \ldots$ so that the value of a target variable y can be obtained when the values of state variables $x_1, x_2, x_3, \ldots$ are applied to the regression equation in the process of the learning. The learning method is not limited to this and varies for each algorithm for supervised learning.

$$y = a_0 + a_1 x_1 + a_2 x_2 + a_3 x_3 + \ldots + a_n x_n. \quad (1)$$

Various methods, such as the least squares method, stepwise method, SVM, neural network method, and decision tree learning, are generally known as algorithms for supervised learning. Any of these algorithms for supervised learning may be adopted as a method applied to the present invention. Since the algorithms for supervised learning are well-known, a detailed description thereof is omitted herein.

The following is a description of a specific embodiment of a failure cause diagnostic device according to the present invention incorporated with the machine learning device for supervised learning.

2. Embodiment

FIG. 2 is a diagram showing a schematic configuration of the failure cause diagnostic device according to the one embodiment of the present invention. A failure cause diagnostic device 10 of the present embodiment comprises a supervised machine learning device (surrounded by a dotted-line frame in FIG. 2). The failure cause diagnostic device 10 is connected to a plurality of injection molding machine 1a, 1b and 1c by communication lines, signal lines, or the like. State data indicative of the respective states of the injection molding machines 1a to 1c are transmitted from the injection molding machines to the failure cause diagnostic device 10.

A state observation unit 11 of the failure cause diagnostic device 10 is a function means for observing the state data for injection molding delivered from the injection molding machines 1a to 1c and acquiring them into the failure cause diagnostic device 10. The state data include, for example, a load on a driving unit of each injection molding machine, frequency response of axes, resin pressure, clamping force, machine operation history, process monitoring data for each molding cycle, molding conditions, quality information on a molded article, alarming (history), failure information, and the like.

A state data storage unit 12 is a function means that stores the state data acquired by the state observation unit 11 and data on a diagnosis result predicted by a state prediction unit 15 (described later) and outputs the stored state data and the data on the diagnosis result in response to an external request. The state data stored by the state data storage unit 12 are stored as a set of state data generated for each molding operation or in each predetermined time. Further, each state data is stored for each injection molding machine.

A state learning unit 13, a learning result storage unit 14, and the state prediction unit 15 are function means that constitute a principal part of the supervised machine learning device.

The state learning unit 13 performs supervised learning based on the state data acquired by the state observation unit 11 and the state data stored by the state data storage unit 12 and stores the learning result storage unit 14 with the result of the learning. The state learning unit 13 of the present embodiment advances the supervised learning with the occurrence of alarming or the occurrence of failure in the state data assumed to be the target variable and with the other state data as the teacher data. If the regression equation for the prediction model is used, as an example of the learning, it may be provided for each type of alarm or each type of failure. If the SVM, neural network method, or decision tree is used, moreover, a classifier may be provided for each type of alarm or each type of failure. As for a plurality of injection molding machines, they may be handled in common for the learning, or otherwise, the learning may be performed separately for a special injection molding machine.

In the learning, a set of the state data for each start of the molding operation and the alarming or failure state may be assumed to be the teacher data. In this case, the possibility of alarming or failure can be predicted for each molding operation based on the result of the learning. Alternatively, the teacher data may be configured so that a state variable is set based on state data at a certain time t and the occurrence of alarming or failure in state data at a time (t+α) after a predetermined period of time α is assumed to be the target variable. In this case, the possibility of alarming or failure after the passage of the predetermined time period α with the injection molding machine in a certain state can be predicted based on the result of the learning.

The learning result storage unit 14 is a function means for storing the result of the learning by the state learning unit 13 based on the teacher data. The learning result storage unit 14 outputs the result of the learning stored in response to an external request. By this function, the learning result stored by the learning result storage unit 14 can also be applied to another failure cause diagnostic device or the like.

Based on the learning result stored in the learning result storage unit 14, the state prediction unit 15 predicts the occurrence of alarming or failure using the respective state data of the injection molding machines 1a to 1c acquired by the state observation unit 11.

If the occurrence of alarming or failure is predicted or if alarming or failure is actually caused, moreover, the state prediction unit 15 guesses the state variable causative of the occurrence of the alarming or the failure, and calculates an adjustment value for canceling the occurrence of the alarming or the failure related the value of the guessed state variable.

In a possible method for guessing the state variable causative of the occurrence of alarming or failure, past data stored in the state data storage unit 12 are statistically processed, and the correlation between the respective state variables and the occurrence of alarming or failure (target variable) is analyzed. Machine learning or a conventional statistical method may be used for the analysis of the correlation. If the correlation between the state variables and the target variable is analyzed when there is a correlation between specific state variables, a plurality of state variables may be supposed to cause failure cause (a plurality of state variables with the same degree of correlation may be extracted). If there is a correlation between the state variables, to overcome such a situation, the correlation between the state variables should only be previously registered so that a state variable to be adjusted can be identified based on the registered correlation. For example, too high an injection speed and the resulting high pressure may sometimes be primary and secondary causes, respectively. In this case, it is necessary only that the relationship between the injection speed and the pressure be registered in advance by machine learning so that the injection speed as the primary cause and the pressure as the secondary cause can be identified.

A heuristic method may be another possible method for guessing the state variable causative of the occurrence of alarming or failure. A heuristic for the occurrence of each alarming or failure may be registered in advance so that the state variable causative of failure cause can be identified according to the registered heuristic when the occurrence of alarming or failure is predicted. The heuristic may, for example, be "the injection speed is a cause if it is equal to or higher than a threshold when a pressure alarm is predicted". The heuristic of this type may be automatically registered by machine learning or previously registered by a skilled operator or the like. In this way, the state variable that is causative when the occurrence of alarming or failure is predicted can be identified.

Further, the state prediction unit 15 adjusts the value of the state variable supposed to be the cause of the occurrence of alarming or failure to the value for canceling the occurrence of the alarming or the failure if the occurrence of the alarming or the failure is predicted or if the alarming or the failure is actually caused.

In a method for adjusting the value of the state variable supposed to be the cause, the value of the state variable supposed to be the cause of the occurrence of the alarming or the failure is changed within a predetermined range, and the occurrence of alarming or failure based on the learning result stored in the learning result storage unit 14 is tentatively predicted using the adjusted value of the state variable. If neither alarming nor failure is predicted to be caused as a result of the tentative prediction, the adjusted value of the state variable is assumed to be the adjusted value. If alarming or failure is predicted to be caused as a result of the tentative prediction, the state variable is adjusted again, and this processing is repeated so that alarming or failure ceases to occur in the tentative prediction. In the adjustment of state variables, it is necessary only that the direction (positive or negative) of the adjustment, each adjustment range, and the like be defined in advance for each type of state variable so that the state variable causative of alarming or failure having occurred or expected to occur can be adjusted.

Furthermore, the state prediction unit 15 outputs information on the injection molding machine predicted to be subject to the occurrence of alarming or failure, the state variable causative of the predicted occurrence of alarming or failure, and the adjusted value of the causative state variable to a prediction result output unit 16.

The prediction result output unit 16 outputs the information output from the state prediction unit 15 to the operator. The prediction result output unit 16 may be configured to cause a display device (not shown) of the failure cause diagnostic device to display the information output from the state prediction unit 15 or to output the information to a centralized control device (not shown) connected by a network. Further, the prediction of the occurrence of alarming or failure by the state prediction unit 15 may be notified by acoustic or optical means.

The failure cause diagnostic device 10 of the present invention may be constructed as a part of a controller for an injection molding machine or as a device separate from the controller for the injection molding machine. In this case, the failure cause diagnostic device 10 may be constructed as a part of a management device that manages a plurality of injection molding machines, for example.

Further, the state data on the individual injection molding machines acquired by the failure cause diagnostic device 10 and stored in the state data storage unit 12 may be managed as data common to the injection molding machines.

Furthermore, a structure equivalent to the machine learning device of the failure cause diagnostic device 10 may be configured to be removable from the failure cause diagnostic device 10. Also, machine learning devices having completed learning can be mass-produced by retrieving the learning result stored in the learning result storage unit 14 of each machine learning device having completed learning and the state data stored in the state data storage unit 12 and storing another machine learning device with them.

While an embodiment of the present invention has been described herein, the invention is not limited to the above-described embodiment and may be suitably modified and embodied in various forms.

The invention claimed is:

1. A failure cause diagnostic device configured to determine a cause of failure of at least one injection molding machine, the device comprising a machine learning device configured to
 receive internal and external state data from the at least one injection molding machine, during a failure state and a non-failure state of the at least one injection molding machine,
 register a correlation among the internal and external state data in advance to identify primary and secondary causes of the failure state,
 perform machine learning on the internal and external state data to obtain an internal parameter of the machine learning device,
 set a state variable based on the internal and external state data at a predetermined time and a target variable based on a prediction of the failure state after a predetermined time period, and
 predict that the failure state of the injection molding machine occurs after the predetermined time period from the predetermined time.

2. The failure cause diagnostic device according to claim 1, wherein the internal and external state data include a load on a driving unit of the injection molding machine, frequency response of axes, resin pressure, clamping force, alarming history, machine operation history, process monitoring data for each molding cycle, molding conditions, and/or quality information on a molded article and information on the occurrence of failure cause.

3. The failure cause diagnostic device according to claim 1, further configured to predict the failure cause of the injection molding machine using the state data based on the result of the machine learning.

4. The failure cause diagnostic device according to claim 3, further configured to identify state data causative of failure cause among the state data in response to predicting the occurrence of the failure cause.

5. The failure cause diagnostic device according to claim 3, further configured to calculate the correlation between the state data and the occurrence of failure cause in response to predicting the occurrence of the failure cause.

6. The failure cause diagnostic device according to claim 3, further configured to calculate an adjusted value of the state data so that no failure cause occurs in response to predicting the occurrence of failure cause.

7. The failure cause diagnostic device according to claim 1, further configured to identify state data causative of failure cause among the state data in response to causing the failure cause.

8. The failure cause diagnostic device according to claim 1, further configured calculate the correlation between the state data and the occurrence of failure cause in response to causing the failure cause.

9. The failure cause diagnostic device according to claim 1, further configured to calculate an adjusted value of the state data so that no more failure cause occurs in response to causing a failure cause.

10. The failure cause diagnostic device according to claim 1, wherein the internal and external state data are input from a plurality of injection molding machines connected by a network.

11. The failure cause diagnostic device according to claim 1, further configured to share the internal parameter of the machine learning device by a plurality of injection molding machines connected by a network.

12. A machine learning device configured to:
 receive internal and external state data from at least one injection molding machine, during a failure state and a non-failure state of the at least one injection molding machine;
 register a correlation among the internal and external state data in advance to identify primary and secondary causes of the failure state;
 perform the machine learning on the internal and external state data to obtain an internal parameter of the machine learning device;
 set a state variable based on the internal and external state data at a predetermined time and a target variable based on a prediction of the failure state after a predetermined time period; and
 predict that the failure state of the injection molding machine occurs after the predetermined time period from the predetermined time.

* * * * *